(12) United States Patent
Zientara et al.

(10) Patent No.: US 10,781,896 B2
(45) Date of Patent: Sep. 22, 2020

(54) BELT TIGHTENING MECHANISM FOR A FLUID DELIVERY SYSTEM

(71) Applicant: Wagner Spray Tech Corporation, Plymouth, MN (US)

(72) Inventors: Daniel R. Zientara, Lakeville, MN (US); Jonathan L. Schaumann, Champlin, MN (US); Frank Gregory Mirazita, Lakeville, MN (US)

(73) Assignee: Wagner Spray Tech Corporation, Plymouth, MN (US)

( * ) Notice: Subject to any disclaimer, the term of this patent is extended or adjusted under 35 U.S.C. 154(b) by 7 days.

(21) Appl. No.: 15/586,378

(22) Filed: May 4, 2017

(65) Prior Publication Data

US 2018/0017144 A1 Jan. 18, 2018

Related U.S. Application Data

(60) Provisional application No. 62/361,105, filed on Jul. 12, 2016.

(51) Int. Cl.
*F16H 7/14* (2006.01)
*F04B 17/06* (2006.01)
(Continued)

(52) U.S. Cl.
CPC ............... *F16H 7/14* (2013.01); *B05B 9/007* (2013.01); *B05B 9/0413* (2013.01); *F04B 9/02* (2013.01);
(Continued)

(58) Field of Classification Search
CPC .............. F16C 2326/02; F16C 33/805; F16C 33/7886; F16J 15/3264; F16J 15/3232;
(Continued)

(56) References Cited

U.S. PATENT DOCUMENTS

| 1,488,618 A | * | 4/1924 | Robinson | .................. F16H 7/14 |
| | | | | 474/115 |
| 1,629,918 A | * | 5/1927 | Kastler | .................... B61C 9/10 |
| | | | | 474/115 |

(Continued)

FOREIGN PATENT DOCUMENTS

| EP | 1013499 B1 | 2/2003 |
| WO | WO 99-53220 A1 | 10/1999 |

(Continued)

OTHER PUBLICATIONS

International Search Report and Written Opinion for International Patent Application No. PCT/US2017/036778, dated Sep. 6, 2017, date of filing: Jun. 9, 2017, 15 pages.

(Continued)

*Primary Examiner* — Henry Y Liu
(74) *Attorney, Agent, or Firm* — Christopher J. Volkmann; Kelly, Holt & Christenson, PLLC

(57) ABSTRACT

In one embodiment, a fluid delivery system includes a motor assembly and a fluid pump assembly. The fluid pump assembly is spaced apart from the motor assembly, and at least one of the motor assembly or the fluid pump assembly is movable to change a distance between the motor assembly and the fluid pump assembly. The fluid delivery system includes a flexible linkage that couples the motor assembly to the fluid pump assembly, and is configured to transfer motion from the motor assembly to the fluid pump assembly. Further, the fluid delivery system comprises a linkage tightening mechanism configured to generate a tightening force on the linkage by biasing at least one of the motor assembly or the fluid pump assembly in a direction that increases the distance between the motor assembly and the fluid pump assembly.

13 Claims, 9 Drawing Sheets

(51) Int. Cl.
| | |
|---|---|
| *F04B 53/22* | (2006.01) |
| *B05B 9/00* | (2006.01) |
| *B05B 9/04* | (2006.01) |
| *F04B 9/02* | (2006.01) |
| *F04B 15/02* | (2006.01) |
| *F04B 17/03* | (2006.01) |
| *F04B 17/05* | (2006.01) |
| *F16H 7/02* | (2006.01) |
| *F16H 7/08* | (2006.01) |

(52) U.S. Cl.
CPC .............. *F04B 15/02* (2013.01); *F04B 17/03* (2013.01); *F04B 17/05* (2013.01); *F04B 17/06* (2013.01); *F04B 53/22* (2013.01); *F16H 7/02* (2013.01); *F16H 2007/0842* (2013.01); *F16H 2007/0865* (2013.01); *F16H 2007/0891* (2013.01); *F16H 2007/0895* (2013.01)

(58) Field of Classification Search
CPC ..... F16H 7/14; F16H 2007/0806; H02K 5/26; F16M 7/00; F04B 17/03
USPC ........................................................ 474/115
See application file for complete search history.

(56) References Cited

U.S. PATENT DOCUMENTS

| | | | | | |
|---|---|---|---|---|---|
| 1,802,513 | A | * | 4/1931 | Hull | F25D 23/006 474/115 |
| 1,878,983 | A | * | 9/1932 | Harris | H02K 5/26 474/115 |
| 2,046,533 | A | * | 7/1936 | Robinson | A47J 43/08 474/115 |
| 2,187,684 | A | * | 1/1940 | Fox | F16N 13/10 222/385 |
| 2,335,508 | A | * | 11/1943 | Gustafsson | F04D 19/002 415/220 |
| 2,509,458 | A | * | 5/1950 | Oliver | F16H 7/14 474/115 |
| 2,646,951 | A | * | 7/1953 | Sloyan | H02K 5/26 248/655 |
| 2,762,661 | A | * | 9/1956 | Sloyan | F16H 7/14 384/7 |
| 2,762,662 | A | * | 9/1956 | Sloyan | F16H 7/14 384/49 |
| 2,833,597 | A | * | 5/1958 | Sloyan | F16C 29/00 384/38 |
| 2,874,006 | A | * | 2/1959 | Sloyan | F16H 7/14 384/29 |
| 2,887,228 | A | * | 5/1959 | Harlan | B01D 29/114 210/108 |
| 3,477,670 | A | * | 11/1969 | Sloyan | F16M 11/24 248/653 |
| 3,814,358 | A | * | 6/1974 | Sloyan | F16H 3/00 248/655 |
| 3,940,065 | A | | 2/1976 | Ware et al. | |
| 4,120,277 | A | * | 10/1978 | Ehlen | F02P 1/083 123/149 D |
| 4,341,506 | A | * | 7/1982 | Klein | F04B 41/02 417/362 |
| 4,344,598 | A | * | 8/1982 | Sloyan | F16M 7/00 248/651 |
| 4,525,126 | A | * | 6/1985 | Launnont | F04C 11/008 417/310 |
| 4,600,368 | A | | 7/1986 | Sommer | |
| 4,952,198 | A | * | 8/1990 | Cartaud | F16H 7/1236 474/138 |
| 5,120,277 | A | * | 6/1992 | Georget | F16F 3/12 474/117 |
| 5,242,331 | A | | 9/1993 | Konig | |
| 5,378,119 | A | * | 1/1995 | Goertzen | F04B 35/04 312/236 |
| 5,934,883 | A | * | 8/1999 | Osterloff | B05B 9/0403 417/313 |
| 6,004,112 | A | * | 12/1999 | Cook | F16H 7/14 417/362 |
| 6,030,305 | A | * | 2/2000 | Hood | F16H 7/14 474/109 |
| 6,345,960 | B1 | * | 2/2002 | Persson | A01J 11/16 417/313 |
| 6,398,681 | B1 | * | 6/2002 | Wanie | F16H 7/1263 474/101 |
| 6,684,735 | B2 | * | 2/2004 | Watanabe | F16F 15/1203 428/450 |
| 6,935,216 | B1 | * | 8/2005 | Yan | B26D 5/08 474/115 |
| 7,674,044 | B2 | * | 3/2010 | Matsui | F16C 33/7876 384/480 |
| 7,927,081 | B2 | * | 4/2011 | MacNeil | F04B 17/03 417/361 |
| 8,474,825 | B2 | * | 7/2013 | Nakagawa | F16J 15/164 277/353 |
| 8,910,917 | B1 | * | 12/2014 | Bees | F16M 7/00 248/657 |
| 8,921,735 | B2 | | 12/2014 | Helf et al. | |
| 9,097,314 | B2 | | 8/2015 | Wolf et al. | |
| 9,102,574 | B1 | | 8/2015 | Chambers et al. | |
| 9,103,411 | B2 | | 8/2015 | Wolf et al. | |
| 10,041,562 | B2 | * | 8/2018 | Kamiya | F16F 15/126 |
| 2007/0212235 | A1 | * | 9/2007 | MacNeil | F04B 17/03 417/361 |
| 2008/0098544 | A1 | | 5/2008 | Rutkowski et al. | |
| 2009/0023526 | A1 | * | 1/2009 | Larouche | F16H 7/14 474/101 |
| 2011/0237373 | A1 | * | 9/2011 | Barrios | F16H 7/14 474/113 |
| 2011/0306451 | A1 | | 12/2011 | Montplaisir | |
| 2013/0312225 | A1 | | 11/2013 | Olson | |
| 2014/0228177 | A1 | | 8/2014 | Brewer et al. | |
| 2014/0269146 | A1 | | 9/2014 | Harris et al. | |
| 2015/0097021 | A1 | * | 4/2015 | Persson | B65G 23/06 228/114.5 |

FOREIGN PATENT DOCUMENTS

| | | |
|---|---|---|
| WO | WO 2009009893 A1 | 1/2009 |
| WO | WO 2013071073 A1 | 5/2013 |
| WO | WO 2015130171 A1 | 9/2015 |

OTHER PUBLICATIONS

International Preliminary Report on Patentability for International Patent Application No. PCT/US2017/036778 dated Jan. 24, 2019, 12 pages.
Extended Search Report for European Patent Application No. 17828130.9 dated Nov. 4, 2019, 14 pages.
First Office Action for Chinese Patent Application No. 201780036513.X dated Jul. 31, 2019. 11 pages with English Translation.
Second Office Action for Chinese Patent Application No. 201780036513.X dated Apr. 2, 2020, 14 pages with English Translation.
First Examination Report for Indian Patent Application No. 201827041618 dated Jul. 29, 2020, 6 pages.

* cited by examiner

BELT TIGHTENING MECHANISM FOR A FLUID DELIVERY SYSTEM The present application is based on and claims the benefit of U.S. provisional patent application Ser. No. 62/361,105, filed Jul. 12, 2016, the contents of which are hereby incorporated by reference in their entirety.

BACKGROUND

The present disclosure generally relates to power-driven systems that utilize drive belts or other flexible linkages. More specifically, but not by limitation, the present disclosure relates to a belt tightening mechanism for tightening a drive belt of a fluid pump in a fluid delivery system.

There are a wide variety of fluid delivery systems. Some fluid delivery systems have mechanisms to dispense fluid and/or viscous material. In examples described herein, "fluid" generally refers to a liquid for a spraying application such as, but not limited to, paint, stain, ink, varnish, water, texture material, etc. Examples of fluid delivery systems include High Volume Low Pressure (HVLP) systems, Low Volume Low Pressure (LVLP) systems, airless sprayers, air assisted sprayers, and air assisted airless (e.g. pneumatic) sprayers, among others.

Some of these systems utilize a motor or engine to drive a fluid pump, which pressurizes the fluid to be sprayed onto a surface. The motor may utilize a drive belt or other flexible linkage that couples to the fluid pump.

The discussion above is merely provided for general background information and is not intended to be used as an aid in determining the scope of the claimed subject matter.

SUMMARY

In one embodiment, a fluid delivery system includes a motor assembly and a fluid pump assembly. The fluid pump assembly is spaced apart from the motor assembly, and at least one of the motor assembly or the fluid pump assembly is movable to change a distance between the motor assembly and the fluid pump assembly. The fluid delivery system includes a flexible linkage that couples the motor assembly to the fluid pump assembly, and is configured to transfer motion from the motor assembly to the fluid pump assembly. Further, the fluid delivery system comprises a linkage tightening mechanism configured to generate a tightening force on the linkage by biasing at least one of the motor assembly or the fluid pump assembly in a direction that increases the distance between the motor assembly and the fluid pump assembly.

This Summary is not intended to identify either key features or essential features of the claimed subject matter, nor is it intended to be used as an aid in determining the scope of the claimed subject matter. Further, the claimed subject matter is not limited to implementations that solve any or all disadvantages noted in the background.

BRIEF DESCRIPTION OF THE DRAWINGS

FIGS. 2-1 and 2-2 illustratively show perspective views of a fluid delivery system, in accordance with one embodiment.

DETAILED DESCRIPTION OF ILLUSTRATIVE EMBODIMENTS

An example power-driven system includes a drive component that drives or otherwise provides power to a driven component. For example, the drive component can be coupled to the driven component via a flexible linkage that transfers rotational motion from the drive component to the driven component. Examples of a flexible linkage include, but are not limited to, drive belts, chains, and the like.

Power-driven systems can be utilized in a wide variety of applications that require the transfer of motion. Some examples include, but are not limited to, automotive applications, industrial applications, and agricultural applications, to name a few. For the sake of the present discussion, but not by limitation, examples will be described in the context of a fluid delivery application (e.g., a paint sprayer, pressure washer, etc.) in which a fluid pump is driven by a motor (e.g., electric, internal combustion, etc.) through a drive belt, or other mechanical linkage that transfers rotational motion to the fluid pump.

Figure 1:
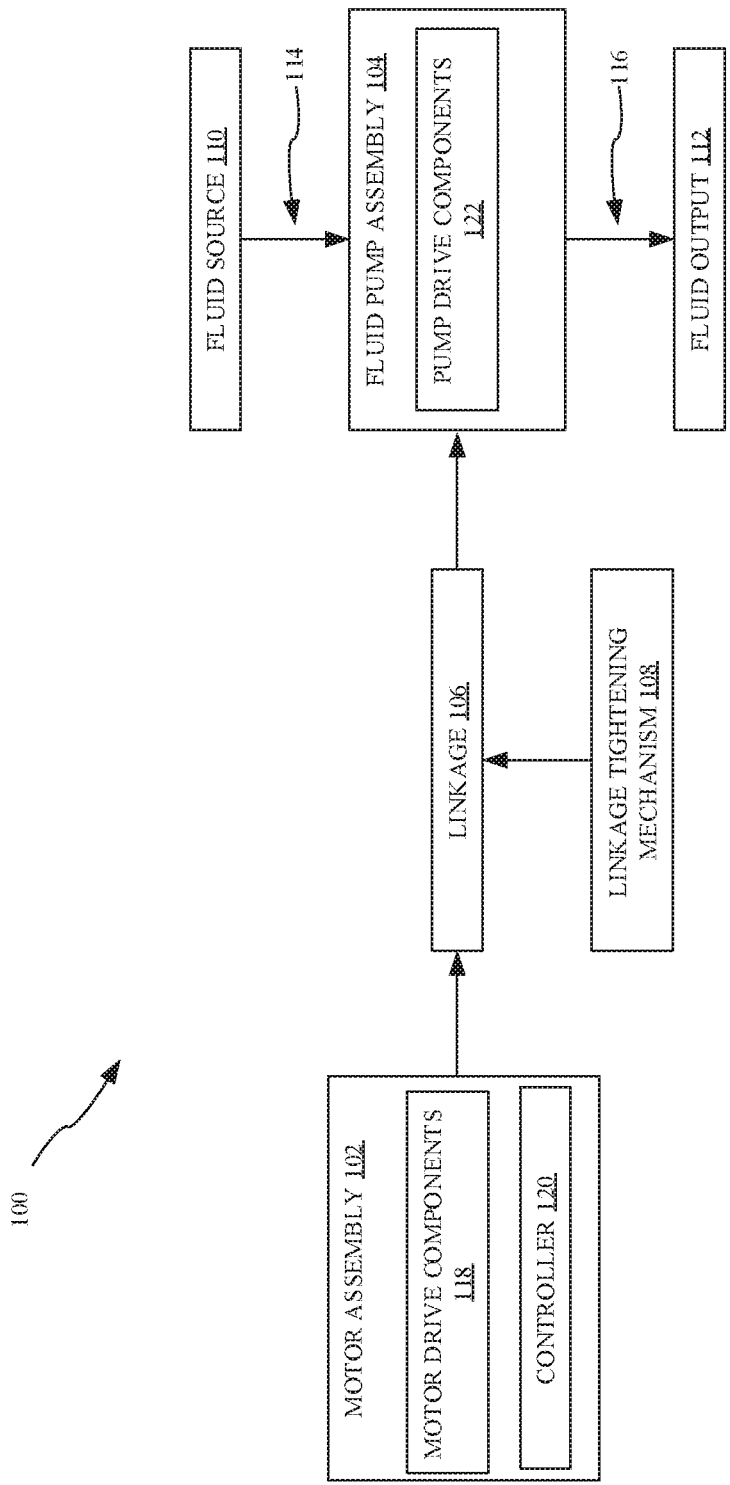
FIG. 1 illustratively shows a schematic block diagram of a fluid delivery system, in accordance with one embodiment.

FIG. 1 illustratively shows a schematic block diagram of a fluid delivery system 100, in accordance with one embodiment. Fluid delivery system 100 illustratively includes a motor assembly 102, a fluid pump assembly 104, a linkage 106, a linkage tightening mechanism 108, a fluid source 110, a fluid output 112, a fluid inlet path 114, and a fluid outlet path 116.

Motor assembly 102 comprises a drive system that generates rotational motion, while fluid pump assembly 104 is configured to be driven by motor assembly 102. Fluid pump assembly 104 is spaced apart from motor assembly 102 at some distance. To transfer rotational motion, linkage 106 couples motor assembly 102 to fluid pump assembly 104. For instance, one or more motor drive components 118 and one or more pump drive components 122 engage linkage 106 such that linkage 106 forms a closed loop between motor assembly 102 and fluid pump assembly 104.

At least one of motor assembly 102 and fluid pump assembly 104 is movable within fluid delivery system 100. In one example, motor assembly 102 is movable with respect to a static position of fluid pump assembly 104 to change the distance between the two assemblies. Movement of motor assembly 102 is facilitated by linkage tightening mechanism 108. For example, linkage tightening mechanism 108 movably supports at least one of motor assembly 102 and fluid pump assembly 104, and is configured to generate a tightening force that biases motor assembly 102 away from fluid pump assembly 104, which increases the distance between motor assembly 102 and fluid pump assembly 104 and effectively tightens linkage 106 between motor drive components 118 and pump drive components 122.

Prior to discussing linkage tightening mechanism 108 in further detail, an overview of fluid delivery system 100 is provided.

Upon receiving motion imparted from motor assembly 102, fluid pump assembly 104 is configured to pressurize and dispense a fluid. As shown in FIG. 1, fluid pump assembly 104 is coupled to fluid source 110 (e.g. a paint container) via fluid inlet path 114. Fluid inlet path 114 includes, in one example, a suction component that forces fluid from fluid source 110 into fluid pump assembly 104. Further, fluid pump assembly 104 is coupled to fluid output 112 via fluid outlet path 116.

Motor assembly 102 also illustratively includes a control 120. Control 120 can include a switch that is configured to control operation of motor assembly 102. For instance, in an embodiment where motor assembly 102 comprises an internal combustion engine, control 120 includes a throttle that controls the speed of motor assembly 102 (e.g. control 120 comprises a throttle that controls revolutions per minute (RPMs) of motor assembly 102).

Figures 1, 2:
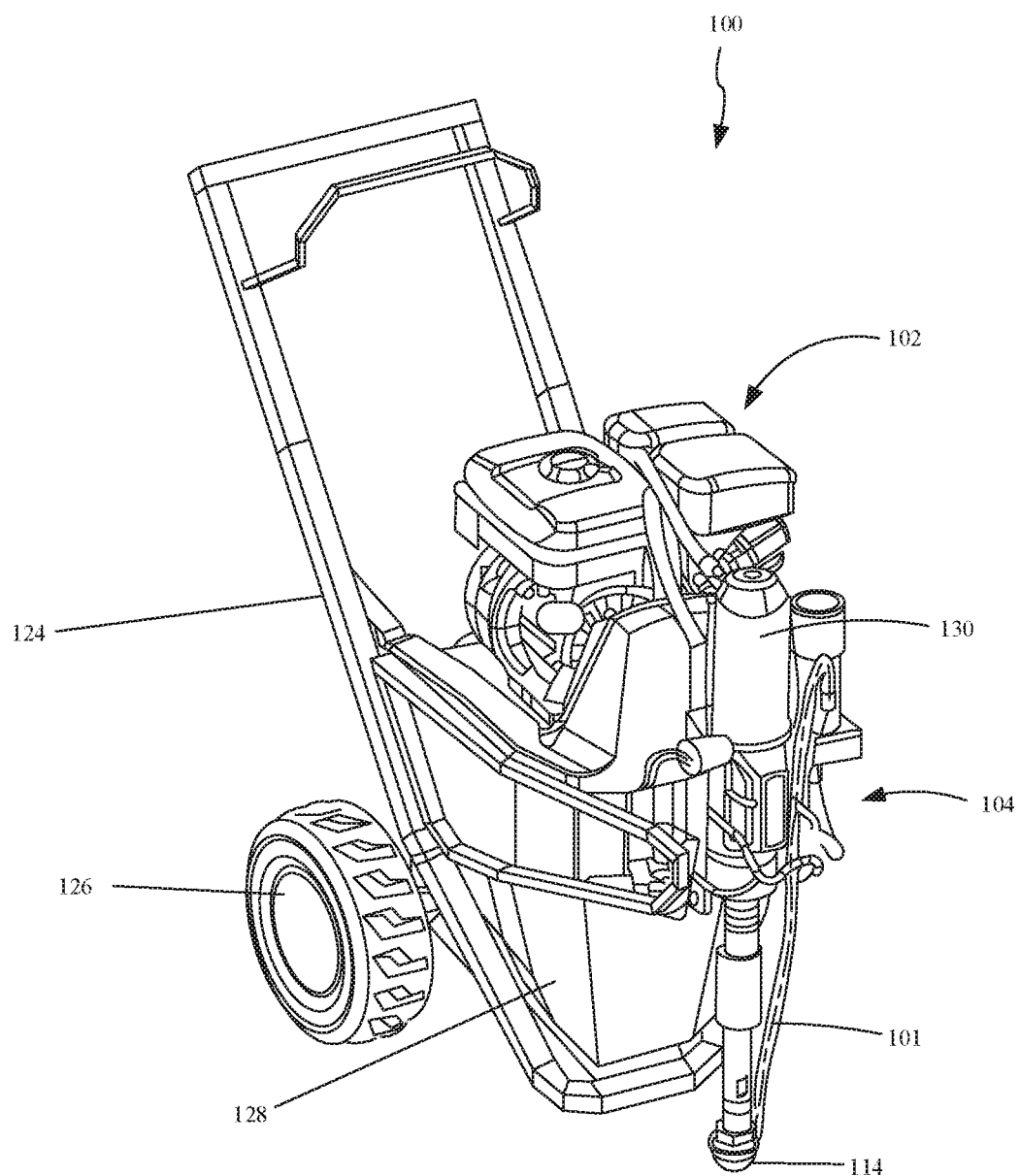
Figure 2:
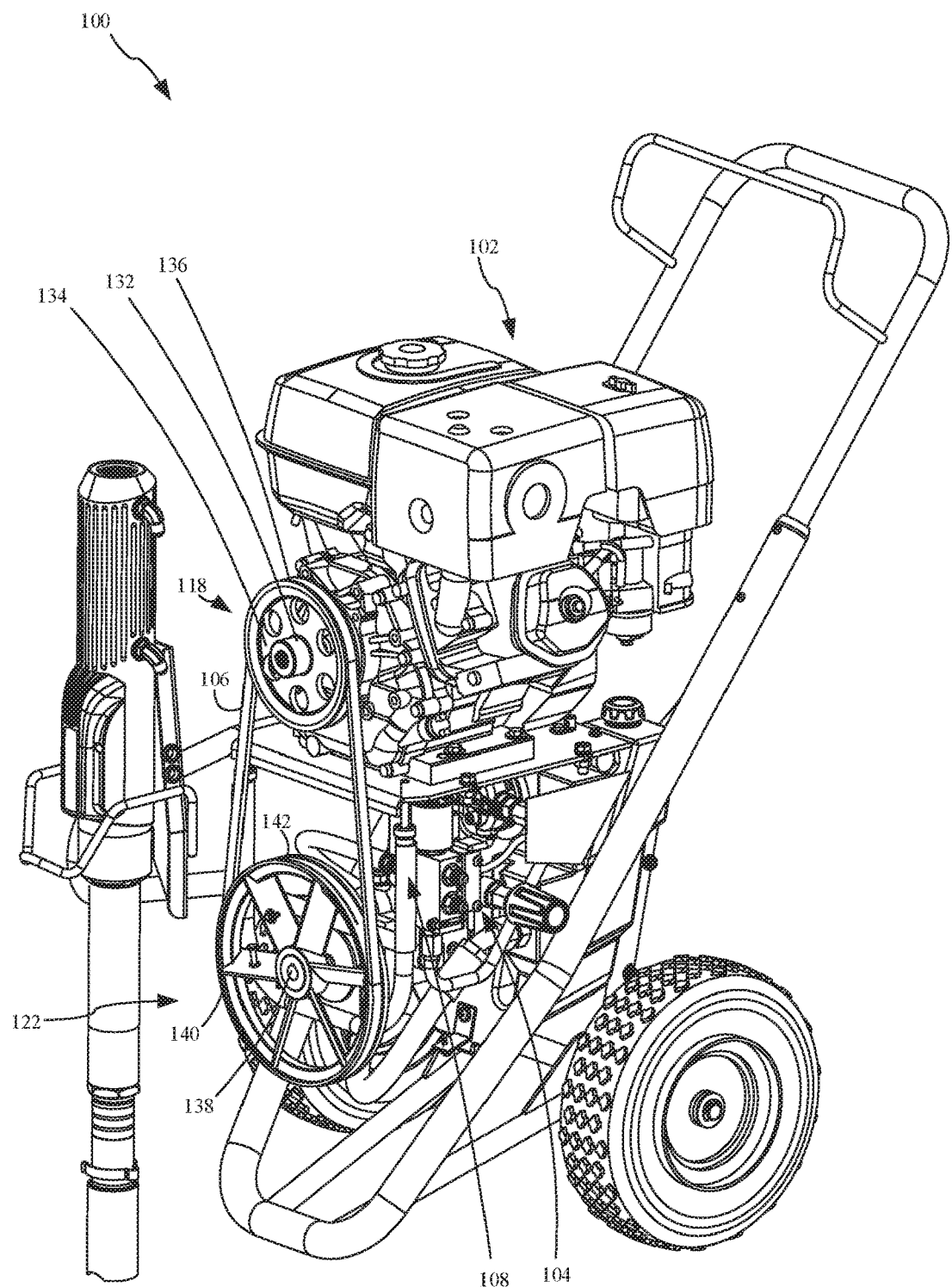

FIG. 2-1 illustratively shows a perspective view of one example of fluid delivery system 100.

Fluid delivery system 100 illustratively includes a drive system (i.e., motor assembly 102) coupled to a driven system (i.e., fluid pump assembly 104) via a flexible linkage 106.

Fluid pump assembly 104 can comprise any of a wide variety of different types of fluid pumps. In one example, fluid pump assembly 104 comprises a hydraulic displacement pump. In addition, or alternatively, fluid pump assembly 104 includes (or is coupled to) a reciprocating piston pump. For instance, fluid pump assembly 104 provides hydraulic fluid to a piston pump 130 to facilitate movement of a mechanical actuator. One example mechanical actuator that can be used with piston pump 130 comprises a piston that reciprocates within a hydraulic cylinder. In such an example, fluid pump assembly 104 actuates reciprocating movement within piston pump 130 to distribute a force on paint. One example fluid delivery system that utilizes hydraulic displacement of a piston pump is found in U.S. Patent Application Ser. No. 62/353,165, assigned to Wagner Spray Tech Corp. of Plymouth, Minn., the assignee of the present application, which is hereby incorporated by reference in its entirety.

In the illustrated example, fluid pump assembly 104 drives piston pump 130 to generate a suction that draws fluid up from fluid source 110 and into fluid inlet path 114. Fluid pump assembly 104 pressurizes (and/or atomizes) the fluid and provides the pressurized fluid to fluid outlet path 116, which further transfers the fluid to fluid output 112. In one example, fluid outlet path 116 comprises a spray gun hose and fluid output 112 comprises a spray gun that is fluidically coupled to the spray gun hose. As also shown in FIG. 2-1, a fluid return path 101 provides a return flow of fluid to fluid source 110. For instance, fluid return path 101 returns paint to a container during priming of fluid pump assembly 104.

Motor assembly 102 can comprise any of a variety of different types of motors operatively configured to drive fluid pump assembly 104. Motor assembly 102, in the illustrated example, is operably coupled to fluid pump assembly 104 to transfer motion and facilitate generating hydraulic displacement which drives reciprocating piston strokes of piston pump 130 to spray a fluid. Generally, motor assembly 102 can also drive one or more peripheral components that, in turn, impart motion to fluid pump assembly 104.

In addition, fluid delivery system 100 is illustratively mounted to cart 124, which comprises wheels 126 that allow an operator to transport fluid delivery system 100 to a desired painting location. Fluid delivery system 100 also illustratively comprises a shroud 128. Shroud 128 serves as a protective covering for various system components. In one embodiment, shroud 128 covers linkage 106 and linkage tightening mechanism 108, and is removable from fluid delivery system 100.

FIG. 2-2 generally shows a perspective view of fluid delivery system 100 with some components (such as shroud 128) removed for illustrative purposes.

Motor assembly 102 comprises motor drive components 118 that include, but are not limited to, an output shaft 132 and a motor wheel 134 (e.g., a flywheel, rotary component, etc.). Motor assembly 102 generates rotational motion and imparts said rotational motion to output shaft 132. Output shaft 132 is further illustratively coupled to motor wheel 134. An outer surface of motor wheel 134 includes a groove 136 configured to engage linkage 106. As such, motor assembly 102 drives rotation of motor wheel 134, which imparts rotational motion to linkage 106.

Fluid pump assembly 104 comprises pump drive components 122, that include, but are not limited to, pump drive shaft 138 and pump wheel 140 (e.g., a flywheel, rotary component, etc.). As shown in FIG. 2-2, pump wheel 140 includes a groove 142 that is configured to engage linkage 106. Linkage 106 thus forms a closed loop between motor drive components 118 and pump drive components 122 when linkage 106 engages around motor wheel 134 and pump wheel 140. In one embodiment, pump wheel 140 comprises a flywheel that stores rotational motion and imparts the rotational motion, as transferred by linkage 106, to pump drive shaft 138. As such, pump wheel 140 is operably coupled to pump drive shaft 138 such that motion imparted to pump wheel 140 is transferred, at least in part, to pump drive shaft 138.

Linkage 106 can be any of a variety of different types of linkages such as a belt, a chain, and the like. In the illustrated example of fluid delivery system 100, linkage 106 comprises a drive belt that includes a single, continuous belt that transfers rotational motion from motor assembly 102 to fluid pump assembly 104. In one embodiment, linkage 106 formed of a rubber material, but can also or alternatively be comprised of a variety of other materials. Depending on of the type of material, linkage 106 stretches (e.g. a drive belt can be made longer without breaking to some degree) when a force (e.g. a tightening force) is applied.

To facilitate removal, replacement, and adjustment of linkage 106, fluid delivery system 100 is configured such that motor assembly 102 is moveable with respect fluid pump assembly 104. That is, a distance between fluid pump assembly 104 and motor assembly 102 can be reduced to allow a user to place linkage 106 on (and remove linkage 106 from) motor assembly 102 and fluid pump assembly 104.

To facilitate movement of motor assembly 102, linkage tightening mechanism 108 slidably engages motor assembly 102. Upon slidably engaging motor assembly 102, linkage tightening mechanism 108 can bias motor assembly 102 away from fluid pump assembly 104, thereby increasing the distance between the two assemblies. By increasing the distance between motor assembly 102 and fluid pump assembly 104, linkage 106 is tightened. As such, linkage tightening mechanism 108 is configured to bias motor assembly 102 away from fluid pump assembly 104 to generate a tightening force that tightens linkage 106. This can prevent slippage of linkage 106 and prevent linkage 106 from inadvertently disengaging fluid pump assembly 104 and/or motor assembly 102.

In some power-driven systems, proper tightening of a linkage is difficult to achieve. As an example, when a drive belt is loose (e.g. it has been stretched previously and requires re-stretching to make the belt taut) the pivot angle at a pulley tensioner needs to be increased to tension the belt. However, an operator may need to pivot the pulley towards the ground or surrounding components. This problem is exacerbated in systems that are designed to be compact and easily transported. When proper belt tension is not achieved, various issues with power driven systems can arise.

For one, the belt can slip off supporting drive components (e.g. a flywheel) during operation. In addition, the powered system can lose efficiency, thereby negatively impacting the longevity of motor, belt, and associated components. Not only can improper belt tightening cause belt slippage and reduce the longevity of the system, it can also negatively affect the accuracy and/or consistency of the fluid delivery pattern (e.g., the spray pattern for painting applications). As a brief example, the tension that is applied to a belt can affect the movement of peripheral devices, such as a piston pump, which can therefore affect the how fluid is provided through the system (e.g., fluctuations in pressure, etc.). Proper tensioning of the belt may prevent a piston from being driven at varying rates (e.g. a varying rate of return of the piston and/or a varying depth and return height of the piston within a hydraulic cylinder). In typical systems, fluctuations in piston reciprocation can result in undesirable tailing and other fluid application inaccuracies. It is important to maintain consistent reciprocation thus maintain consistent transfer of motion from the motor to the pumping mechanism) to minimize pressure differential within the hydraulic cylinder. Thus, it is desirable to utilize a fluid delivery system that maintains proper tightness of a drive belt to improve system performance.

Figure 3:
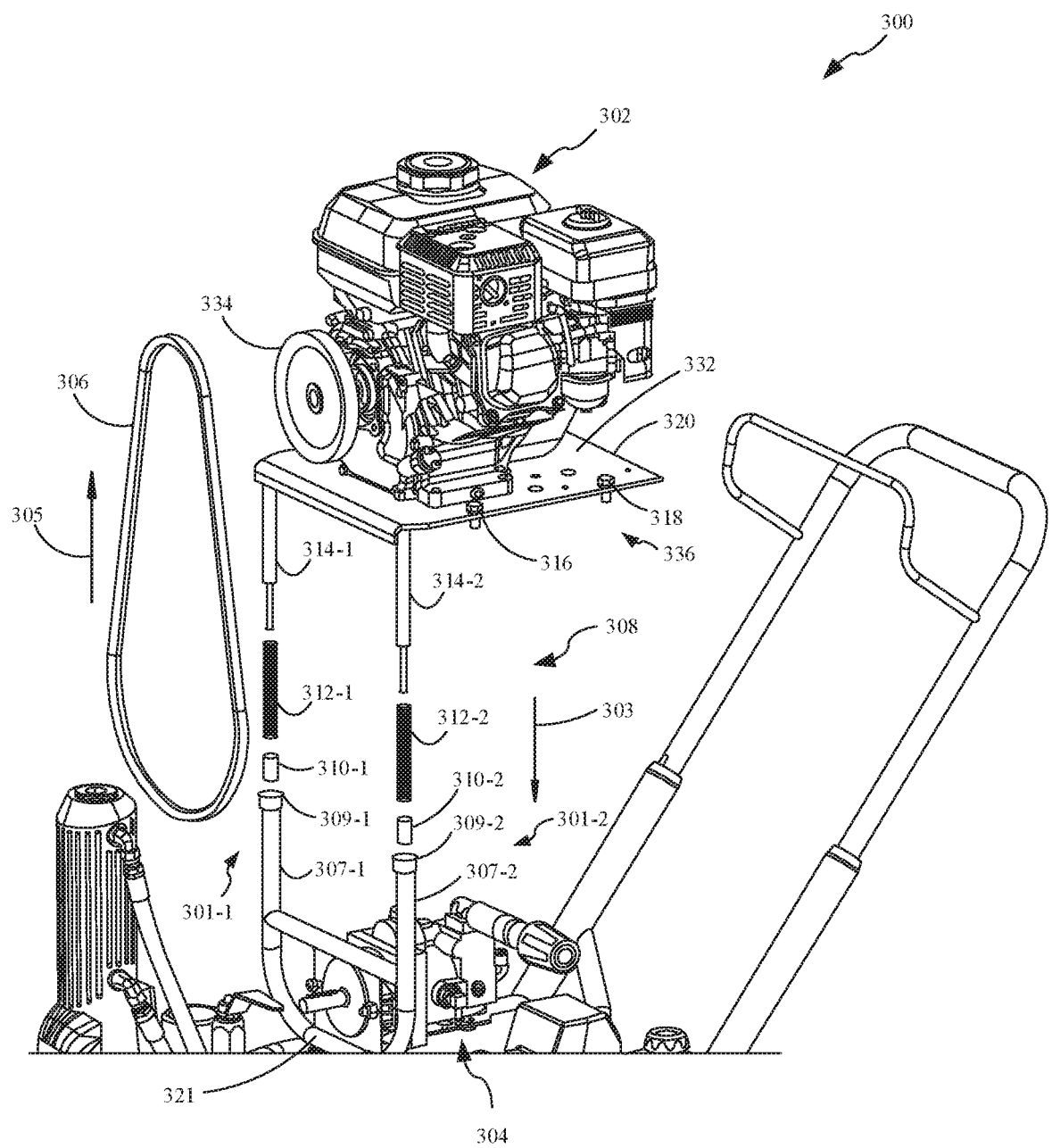
FIG. 3 illustratively shows an exploded view of a belt tightening mechanism, in accordance with an embodiment.

FIG. 3 illustratively shows an exploded view of a belt tightening mechanism 308 of a fluid delivery system 300, in accordance with an embodiment. Fluid delivery system 300 can include any or all of the features described with respect to fluid delivery system 100. For instance, in the illustrated example, fluid delivery system 300 includes a motor assembly 302 and a fluid pump assembly 304 that are substantially similar to motor assembly 102 and fluid pump assembly 104 illustrated in FIGS. 2-1 and 2-2. In addition, belt tightening mechanism 308 can include any or all of the features described with respect to linkage tightening mechanism 108.

Belt tightening mechanism 308 illustratively includes a mounting bracket 321 that is configured to mount belt tightening mechanism 308 at a fixed position in fluid delivery system 300. In one example, mounting bracket 321 is configured to attach (e.g. by projection weld, bracket, or other attachment mechanism) to a portion of fluid pump assembly 304. In such an example, both belt tightening mechanism 308 and fluid pump assembly 304 are in fixed positions relative to one another. In another example, belt tightening mechanism 308 is mounted to a frame (e.g. cart 124) of fluid delivery system 300 such that belt tightening mechanism 308 is in a fixed position relative to the frame.

Belt tightening mechanism 308 illustratively includes a set of parallel supports 301-1 and 301-2. Support 301-1 comprises a tube 307-1, a tube opening 309-1, a stopper 310-1, a spring 312-1, and a plunger 314-1. Similarly, support 301-2 comprises a tube 307-2, a tube opening 309-2, a stopper 310-2, a spring 312-2, and a plunger 314-2.

Tube 307-1 and tube 307-2 are illustratively shown in a U-shaped arrangement to one another. Tube 307-1 and tube 307-2 each include a hollow cylinder, with tube openings 309-1 and 309-2, respectively. While two parallel tubes are shown in the illustrated example, it is noted that any number of parallel tubes can be used and their arrangement can vary in accordance with the features discussed below. For example, belt tightening mechanism 308 can include four, six, or eight tubes.

For the purposes of discussion only, and not by limitation, belt tightening mechanism 308 will be described in further detail with respect to support 301-1. It is noted that one or more additional supports (e.g., support 301-2) can comprise the same or similar features.

Tube 307-1 is configured to receive stopper 310-1, spring 312-1 and plunger 314-1. In one embodiment, tube 307-1 comprises a half-tube configured to prevent the passage of insertable components (e.g. spring 312-1) beyond a stopping point within the tube. As shown in FIG. 3, tube 307-1 is configured to receive stopper 310-1 such that stopper 310-1 forms a receiving surface for spring 312-1 within tube 307-1. In one example, stopper 310-1 forms the half-tube structure of tube 307-1 by plugging the tube at an end opposite that of tube opening 309-1 (e.g. near a base of mounting bracket 321).

As such, tube 307-1 receives spring 312-1 such that spring 312-1 rests on top of stopper 310-1. Tube 307-1 further receives plunger 314-1 such that plunger 314-1 engages a portion of spring 312-1. When a downward force is applied (e.g. in the direction indicated by arrow 303) to plunger 314-1, plunger 314-1 compresses spring 312-1.

FIG. 3 shows that plunger 314-1 is coupled to motor mounting plate 320. For example, plunger 314-1 is welded (or bolted or alternatively secured) to a bottom surface of motor mounting plate 320. In one embodiment, plunger 314-1 engages motor mounting plate 320 and is removable from said engagement.

Motor mounting plate 320 illustratively includes a support surface 322 that supports motor assembly 302. Motor mounting plate 320 is configured to engage and secure motor assembly 302. For example, motor assembly 302 can be bolted to support surface 322.

In addition, fluid delivery system 300 comprises a locking mechanism 336. Locking mechanism 336 includes, for example, but not by limitation, motor mounting plate 320, screws 316 and 318, as well as a fluid delivery system frame (e.g., cart 124). Locking mechanism 336 is configured to lock the distance between motor assembly 302 and fluid pump assembly 304. For instance, screws 316 and 318 are configured to engage corresponding portions of a frame such that motor mounting plate 320, and thus motor assembly 302, are secured to the frame. Upon engaging screws 316 and 318, locking mechanism 336 is configured to fix the position of motor assembly 302 relative to the frame. Thus, because fluid pump assembly 304 is also in a fixed position relative to the frame, locking mechanism 336 maintains the distance between motor assembly 302 and fluid pump assembly 304. Prior to securing motor mounting plate 320 to a supporting frame and thereby effectively locking-in the position of motor assembly 302 with respect to fluid pump assembly 304, motor assembly 302 and the coupled motor mounting plate 320 are movable.

When motor assembly 302 is lowered in the direction generally indicated by arrow 303, plunger 314-1 is inserted into tube opening 309-1 of tube 307-1 such that plunger 314-1 engages a top portion of spring 312-1. Motor assembly 302 generates a downward force on plunger 314-1 in the direction generally indicated by arrow 303. This force can be generated from the mass of motor assembly 302 and the attached components, and in part from, for example, an operator pushing downwards on top of motor assembly 302. Thus, the slidable arrangement of motor assembly 302 can compress spring 312-1 within tube 307-1 as spring 312-1 is prevented from moving downward in tube 307-1 due to stopper 310-1.

Upon compressing spring 312-1, the distance between motor assembly 302 and fluid pump assembly 304 is decreased. This shortened distance can make it easier to engage linkage 306 in a closed loop with the drive components of fluid delivery system 300. In one example, linkage 306 is substantially similar to linkage 106 illustrated in FIGS. 2-1 and 2-2. For instance, an operator can more easily engage linkage 306 around both a pump wheel (not shown in FIG. 3, wherein the pump wheel is stationary relative to motor assembly 302) and motor wheel 334 (which moves correspondingly with motor assembly 302).

Compression of spring 312-1 in the direction indicated by arrow 303 generates a spring return force in the direction generally indicated by arrow 305. Spring return force 305 is imparted to plunger 314-1, and thus further imparted to motor mounting plate 320, thereby biasing motor mounting plate 320 in the direction generally indicated by arrow 305. Therefore, spring return force 305 biases motor assembly 302 away from fluid pump assembly 304 and thereby increases the distance between the two assemblies.

As a result of biasing motor assembly 302 away from fluid pump assembly 304, the distance between the motor drive components and the pump drive components is also increased. For instance, motor wheel 334 is pushed away from the pump wheel. When linkage 306 is engaged and forms a closed loop around motor wheel 334 and the pump wheel, spring return force 305 provides a belt tightening force that is applied to linkage 306 to effectively tighten linkage 306.

As noted above, motor mounting plate 320 can be attached to a supporting frame to lock-in the position of motor assembly 302 with respect to fluid pump assembly 304. This attachment can prevent further biasing of motor assembly 302 away from fluid pump assembly 304 such that linkage 306 maintains a desired tightness.

Figure 4:
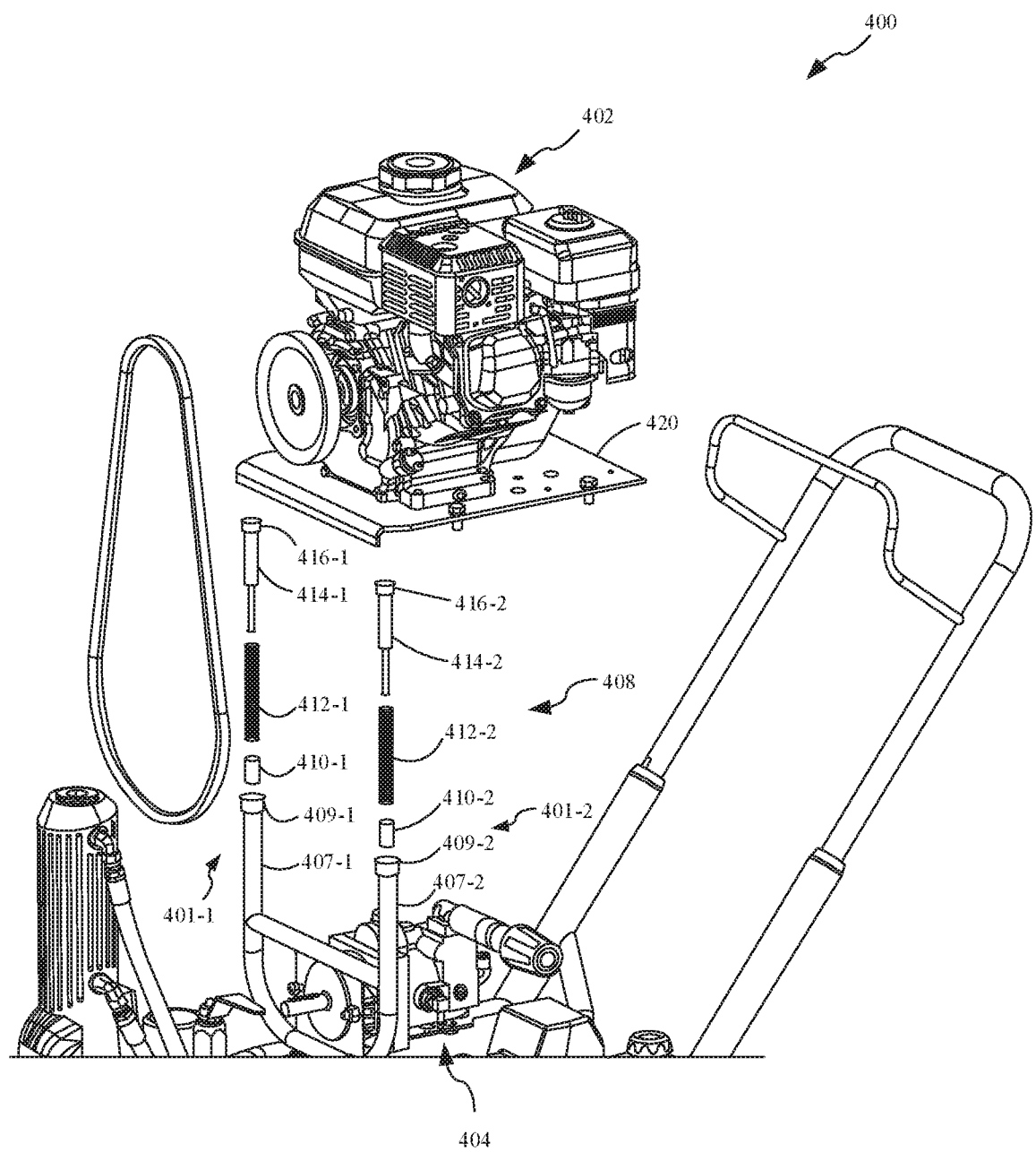
FIG. 4 illustratively shows an exploded view of a closed belt tightening mechanism, in accordance with one embodiment.

FIG. 4 illustratively shows an exploded view of a belt tightening mechanism 408 of a fluid delivery system 400, in accordance with one embodiment. It is noted that fluid delivery system 400 can include any, or all, of the features of fluid delivery system 100 and/or 300, as described above. In the illustrated example, fluid delivery system 400 includes a motor assembly 402 and a fluid pump assembly 404 that are substantially similar to motor assembly 102 and fluid pump assembly 104 illustrated in FIGS. 2-1 and 2-1.

Belt tightening mechanism 408 illustratively includes a set of parallel supports 401-1 and 401-2. Support 401-1 comprises a tube 407-1, a tube opening 409-1, a stopper 410-1, a spring 412-1, a plunger 414-1, and a cap 416-1. Similarly, support 401-2 comprises a tube 407-2, a tube opening 409-2, a stopper 410-2, a spring 412-2, a plunger 414-2, and a cap 416-2.

For the purposes of discussion only, and not by limitation, belt tightening mechanism 408 will be described in further detail with respect to support 401-1. It is noted that one or more additional supports (e.g., support 401-2) can comprise the same or similar features.

In the illustrated embodiment of FIG. 4, belt tightening mechanism 408 is configured to seal tube 407-1 to prevent undesired removal (i.e. ejection) of insertable tightening components such as spring 412-1 and plunger 414-1. When a belt tightening force is generated by belt tightening mechanism 408, components that were inserted into a receiving tube may be undesirably ejected. For instance, a spring can undesirably eject a plunger (as well as other components) out of the tube upon disengaging a belt from the drive components. This may be dangerous, cause undesired damage, and/or require additional installation steps to re-assemble the fluid delivery system.

Cap 416-1 illustratively engages and seals tube opening 409-1. For instance, cap 416-1 is insertable into tube opening 409-1 such that cap 416-1 engages a top portion of plunger 414-1 and a bottom surface of mounting plate 420. In one example, mounting plate 420 includes any, or all, of the features of motor mounting plate 320 described above with respect to FIG. 3. Cap 416-1 is, in one example, tapered such that it can slide downward within tube 407-1 and not prevent insertable components from being engaged (e.g. compressed or slid) by movement of motor assembly 402. Cap 416-1 may also be tapered such that it plugs the end of tube opening 409-1 and prevents undesired ejection of plunger 414-1 and spring 412-1 upon release of the tightening force. In one embodiment, rather than utilizing cap 416-1, a receiving tube has a crimped end.

Figure 5:
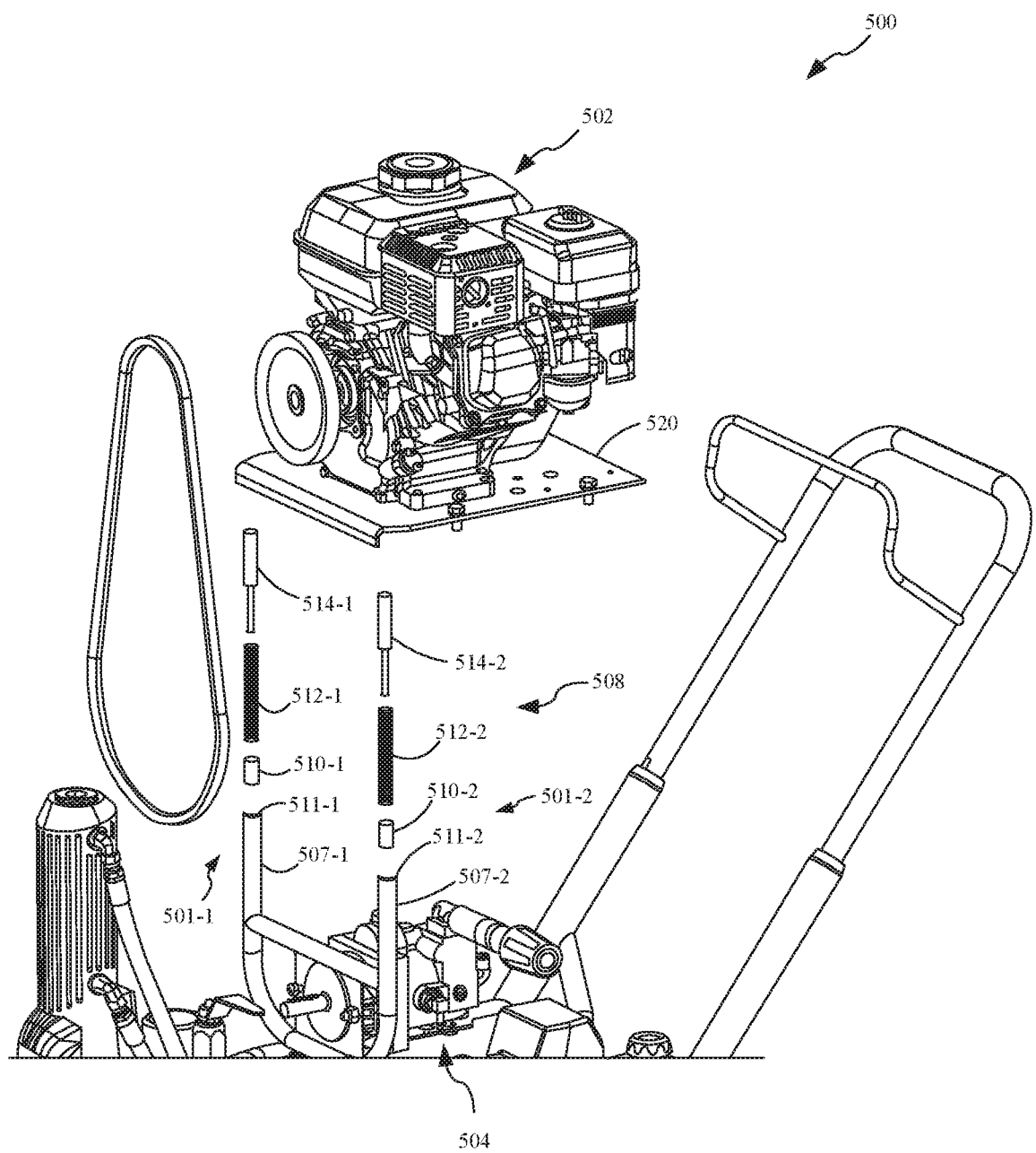
FIG. 5 illustratively shows an exploded view of a modified closed belt tightening mechanism, in accordance with one embodiment.

FIG. 5 illustratively shows an exploded view of a belt tightening mechanism 508 of a fluid delivery system 500, in accordance with one embodiment. It is noted that fluid delivery system 500 can include any or all features of fluid delivery system 100, 300, and/or 400, as described above. In the illustrated example, fluid delivery system 500 includes a motor assembly 502 and a fluid pump assembly 504 that are substantially similar to motor assembly 102 and fluid pump assembly 104 illustrated in FIGS. 2-1 and 2-1.

Belt tightening mechanism 408 illustratively includes a set of parallel supports 501-1 and 501-2. Support 501-1 comprises a tube 507-1, a stopper 510-1, a spring 512-1, a plunger 514-1, and a crimped end 511-1. Similarly, support 501-2 comprises a tube 507-2, a stopper 510-2, a spring 512-2, a plunger 514-2, and a crimped end 511-2.

For the purposes of discussion only, and not by limitation, belt tightening mechanism 508 will be described in further detail with respect to support 501-1. It is noted that one or more additional supports (e.g., support 501-2) can comprise the same or similar features.

As shown in FIG. 5, a circumference of tube 507-1 is configured to be, at least partially, crimped. The term "crimp", as used herein, generally refers to the result of an opening (e.g., tube opening 309-1 as shown and described with respect to FIG. 3) of tube 507-1 being crimped together. For instance, after insertion of insertable tightening components (e.g. spring 512-1 and plunger 514-2), an operator may force the edges of tube 507-1 towards one another to crimp the otherwise open end to secure said tightening components so they do fall out or get undesirably ejected. It is also noted that crimping of tube 507-1, as shown in FIG. 5, can be a partial crimp that leaves a partial opening at the end of the cylinder that defines tube 507-1. In such an example, crimped end 511-1 is configured to allow plunger 514-1 to extend past a partial opening to engage motor mounting plate 520. In one example, motor mounting plate 520 includes any, or all, of the features of motor mounting plate 320 described above with respect to FIG. 3.

Figure 6:
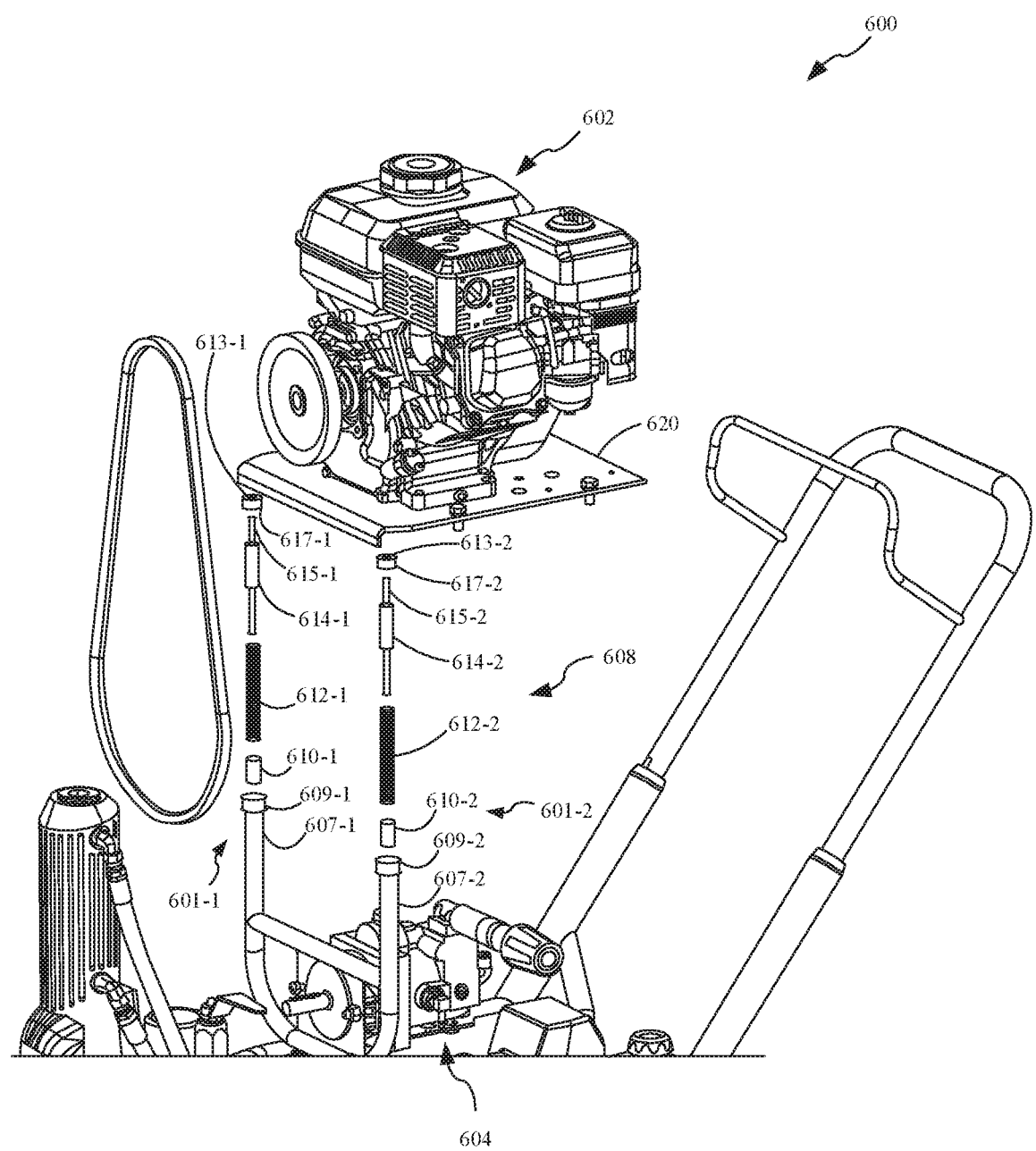
FIG. 6 illustratively shows an exploded view of a belt tightening mechanism including a modified plunger, in accordance with one embodiment.

FIG. 6 illustratively shows an exploded view of a belt tightening mechanism 608, including a modified plunger assembly, of a fluid delivery system 600, in accordance with one embodiment. It is noted that fluid delivery system 600 can include any or all features of fluid delivery system 100, 300, 400, and/or 500, as described above. In the illustrated example, fluid delivery system 600 includes a motor assembly 602 and a fluid pump assembly 604 that are substantially similar to motor assembly 102 and fluid pump assembly 104 illustrated in FIGS. 2-1 and 2-1.

Belt tightening mechanism 608 illustratively includes a set of parallel supports 601-1 and 601-2. Support 601-1 comprises a tube 607-1, a tube opening 609-1, a stopper 610-1, a spring 612-1, a plunger 614-1 including a protruding portion 615-1, and a cap 617-1 including an opening 613-1. Similarly, support 601-2 comprises a tube 607-2, a tube opening 609-2, a stopper 610-2, a spring 612-2, a plunger 614-2 including a protruding portion 615-2, and a cap 617-2 including an opening 613-2.

For the purposes of discussion only, and not by limitation, belt tightening mechanism 608 will be described in further detail with respect to support 601-1. It is noted that one or more additional supports (e.g., support 601-2) can comprise the same or similar features.

Protruding portion 615-1 is configured to be inserted into and protrude past opening 613-1 of cap 617-1. Protruding portion 615-1 protrudes past opening 613-1 to contact motor mounting plate 620. In one example, motor mounting plate 620 includes any, or all, of the features of motor mounting plate 320 described above with respect to FIG. 3. As similarly discussed above, some caps can be beneficial when utilized in belt tightening mechanisms as they prevent undesired ejection of insertable tightening components. However, some tube sealing mechanisms may impede the ability of plungers to impart a tightening force to a motor assembly. The illustrated example of protruding portion 615-1 and cap 617-1 both effectively seal the end of tube 607-1 and allow plunger 614-1 to remain in contact with both spring 612-1 and motor mounting plate 620.

Figure 7:
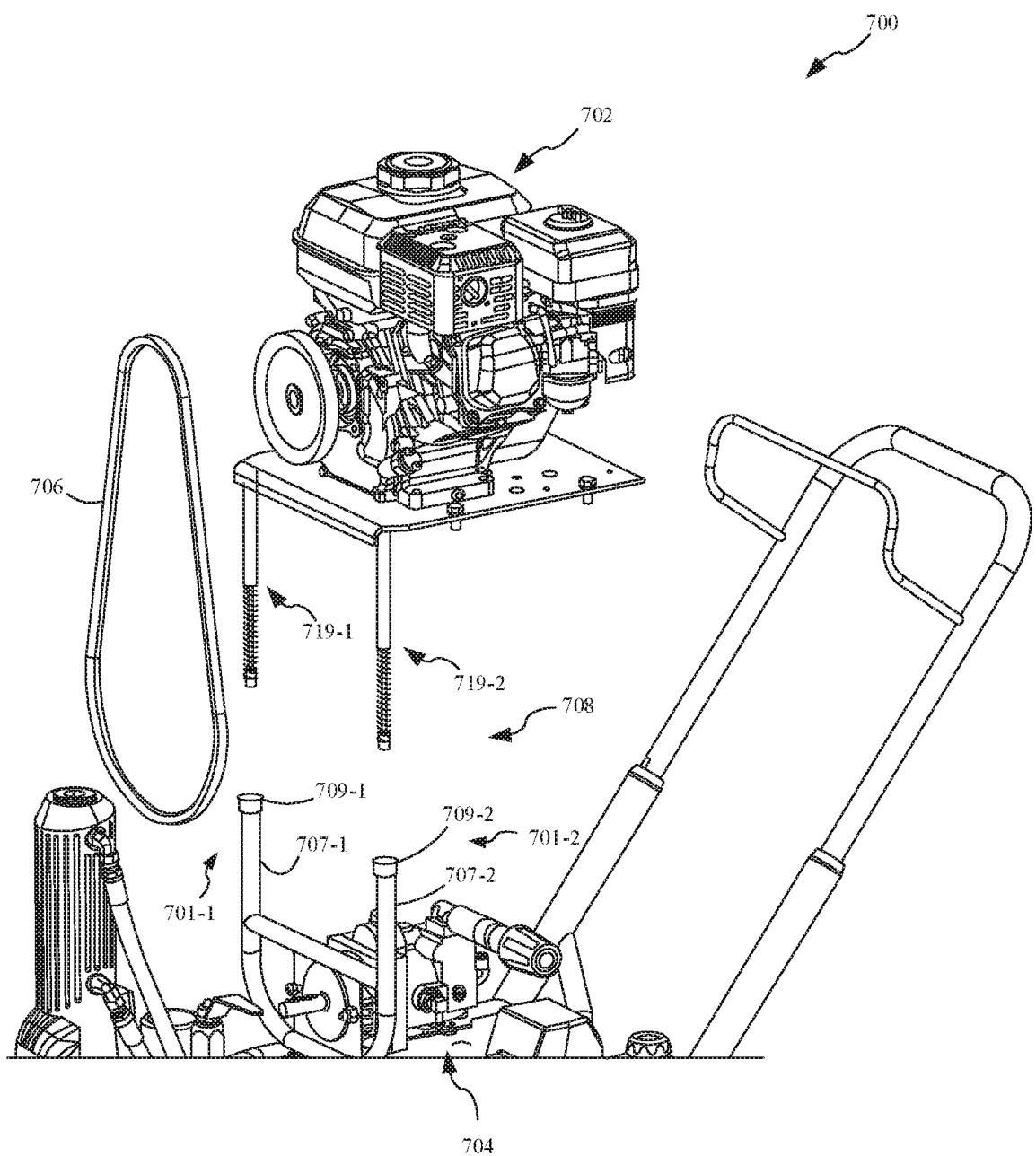
FIG. 7 illustratively shows an exploded view of a belt tightening mechanism including a modular insertable assembly, in accordance with one embodiment.

FIG. 7 illustratively shows an exploded view of a belt tightening mechanism 708, including a modular insertable assembly, of a fluid delivery system 700, in accordance with one embodiment. It is noted that fluid delivery system 700 can include any or all features of fluid delivery system 100, 300, 400, 500 and/or 600, as described above. In the illustrated example, fluid delivery system 700 includes a motor assembly 702 and a fluid pump assembly 704 that are substantially similar to motor assembly 102 and fluid pump assembly 104 illustrated in FIGS. 2-1 and 2-1.

Belt tightening mechanism 708 illustratively includes a set of parallel supports 701-1 and 701-2. Support 701-1 comprises a tube 707-1, a tube opening 709-1, and a modular insertable assembly 719-1. Similarly, support 701-2 comprises a tube 707-2, a tube opening 709-2, and a modular insertable assembly 719-2.

For the purposes of discussion only, and not by limitation, belt tightening mechanism 708 will be described in further detail with respect to support 701-1. It is noted that one or more additional supports (e.g., support 701-2) can comprise the same or similar features.

In one embodiment, modular insertable assembly 719-1 includes a sub-assembly of insertable components (e.g. any combination of stopper 310-1, spring 312-1, plunger 314-1, cap 416-1, and/or cap 617-1, etc., as describe above. Modular insertable assembly 719-1 is shown in the illustrated example as including a pre-fabricated assembly that is configured for insertion in tube 707-1 at tube opening 709-1 as a single unit. Modular insertable assembly 719-1 is also configured to be removed from tube 707-1 as a single unit, as the insertable components are coupled together prior to installation into fluid delivery system 700. These features may decrease the number of installation and disassembly steps that an operator needs to perform.

For instance, it may be difficult for an operator to remove tightening components because the diameter of a receiving tube is not large enough to receive a hand of an operator or a tool to grab the components. In addition, the fluid delivery system may be heavy and adversely affected if the system is rotated in an attempt to remove the inserted components (e.g. tipping the system upside-down to allow the components to fall out of the receiving tube(s)). Belt tightening mechanism 708 addresses these and other challenges by providing an assembly of insertable components (e.g., modular insertable assembly 719-1) that is configured to be installed, uninstalled, repaired, and/or customized with simplified user interaction, thereby improving ease of use of fluid delivery system 700 and belt tightening mechanism 708. In addition, unique combinations of insertable components can be pre-assembled and inserted as single units into receiving tubes of belt tightening mechanism 708 to achieve a customized tightness of linkage 706. In one example, linkage 306 is substantially similar to linkage 106 illustrated in FIGS. 2-1 and 2-2. For example, and not by limitation, an operator may customize the tightness of linkage 706 by using a specific type of spring with modular insertable assembly 719-1. An operator can also add or remove additional springs, and change the distance between a spring and a plunger to achieve a desired tightness of linkage 706. Further, modular insertable assembly 719-1 enables fluid delivery system 700 to utilize a variety of different linkages (e.g. with different degrees of elasticity), and is not limited to only using a particular type of linkage, because the operator can easily adjust the type and quantity of insertable tightening components, thereby customizing the system for many different applications.

Figure 8:
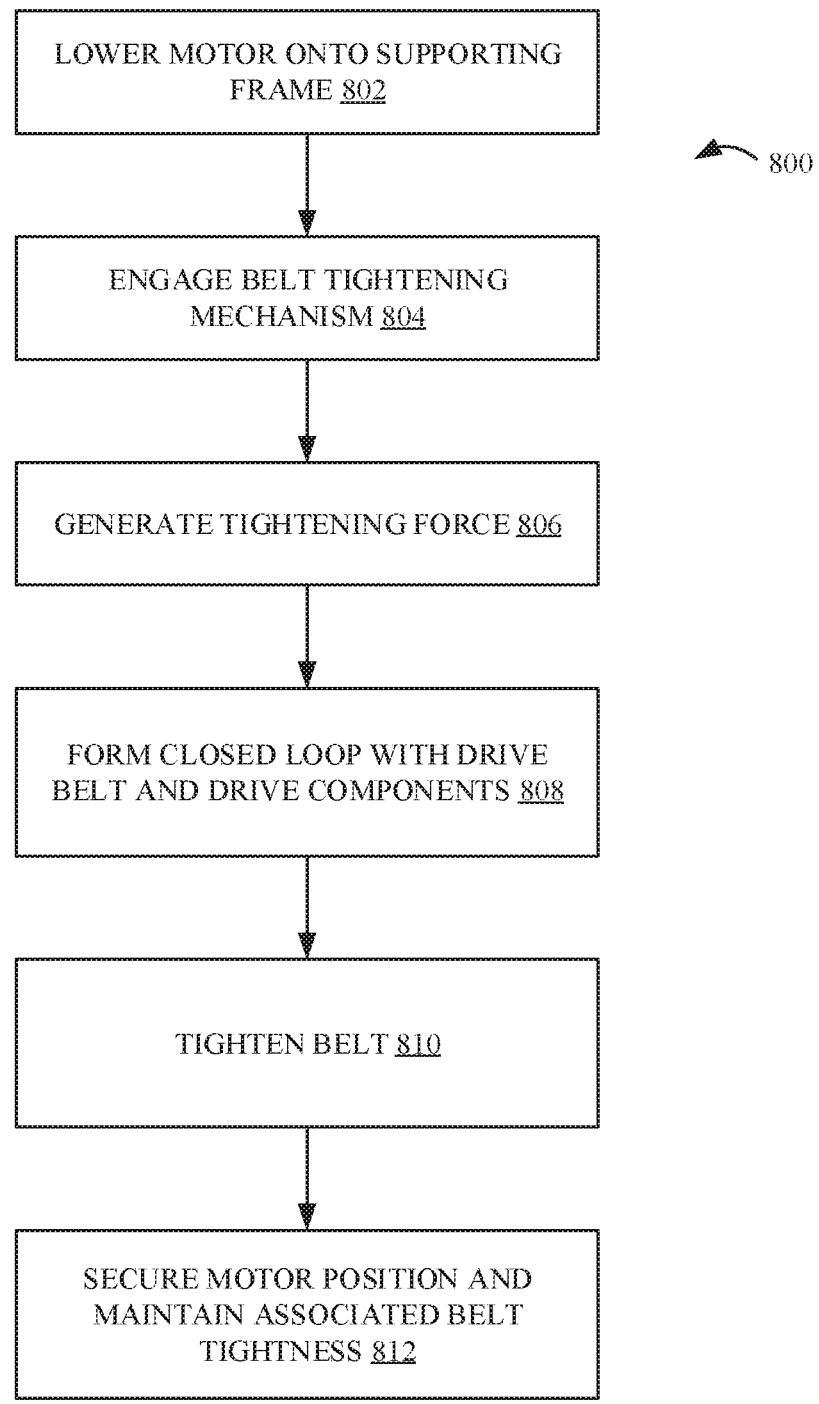
FIG. 8 shows a flow diagram illustrating a method of tightening a belt with a belt tightening mechanism, in accordance with one embodiment.

FIG. 8 is a flow diagram illustrating a method 800 of tightening a drive belt for a fluid delivery system, in accordance with one embodiment. At block 802, method 800 includes lowering a motor assembly of a fluid delivery system with respect to a frame. For instance, method 800 illustratively begins when a motor assembly has yet to be installed into a fluid delivery system. In other words, a motor assembly has yet to engage a drive belt that forms a closed loop to facilitate the driving of a fluid pump via the motor assembly.

At block 804, method 800 illustratively includes engaging a belt tightening mechanism of the fluid delivery system. In one embodiment, the motor assembly is lowered such that one or more plungers are inserted into corresponding parallel receiving tubes and engage springs within the tubes. In other words, a motor assembly is movable (e.g. slidable) as it engages a belt tightening mechanism such that a distance between the motor assembly and the fluid pump assembly is decreased at block 804.

At block 806, method 800 includes generating a tightening force. For instance, generating a tightening force includes generating a spring return force in response to decreasing the distance between the motor assembly and the fluid pump assembly. For instance, block 806 includes slidably engaging a tube with a plunger to compress a spring within the tube. Due to compression of the spring, the distance between said assemblies decreases and it may be easier for an operator to engage the drive belt on the drive components of the system.

At block 808 of method 800, a closed loop is formed between the drive belt and the drive components. For instance, an operator can provide the drive belt along engaging surfaces of one or more flywheels of the system to form the closed loop.

At block 810 of method 800, the drive belt is tightened. In one embodiment, but not by limitation, upon forming the closed loop of the drive belt, the downward force that is applied to the motor assembly to compress the springs can be (at least in part) released. The spring return force, generated by the compressed springs, pushes the drive components away from one another, thereby effectively tightening the drive belt in the closed loop. In other words, block 810 includes biasing the motor assembly away from the fluid pump. This effectively stretches the belt by applying the biasing force to the belt, thereby tightening the drive belt.

At block 812, the motor assembly can be secured to a particular position within the system and thus the belt tightness associated with that position can be maintained for extended periods of operation. For example, as discussed above with respect to FIG. 3, the motor assembly can be secured to a supporting frame when the plungers engage the belt tightening mechanism. The motor assembly can be unsecured and subsequently moved to a different position to further change the distance between the motor assembly and the fluid pump assembly. Thus, varying distances between the motor assembly and the fluid pump assembly can be utilized to provide for different degrees of tightness of the drive belt, and each different distance (and thus tightness) can be maintained.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A portable paint spraying system comprising:
a paint spraying device configured to emit paint in a spray pattern onto a surface;
a cart having a frame;
a motor assembly supported on the cart;
a locking mechanism that fixedly couples the motor assembly to the frame;
a paint pump assembly supported on the cart at a position below the motor assembly and spaced apart from the motor assembly, the paint pump assembly being configured to pump paint through a conduit to the paint spraying device, wherein the paint pump assembly is moveable to change a distance between the motor assembly and the paint pump assembly;
a flexible linkage that couples the motor assembly to the paint pump assembly and is configured to transfer motion from the motor assembly to the paint pump assembly; and
a linkage tightening mechanism configured to generate a tightening force on the linkage by biasing the paint pump assembly in a direction that increases the distance between the motor assembly and the paint pump assembly.

2. The paint delivery system of claim 1, wherein the linkage comprises a drive belt.

3. The paint delivery system of claim 1, wherein the linkage tightening mechanism comprises a set of parallel supports.

4. The paint delivery system of claim 3, wherein each support comprises a tube that receives a spring therein.

5. The paint delivery system of claim 4, wherein each support comprises a plunger insertable into a corresponding one of the tubes and wherein the motor assembly is coupled to the plungers.

6. The paint delivery system of claim 5, wherein each plunger engages the corresponding tube such that the motor assembly is slidably movable with respect to the paint pump assembly.

7. The paint delivery system of claim 6, wherein a reduction in the distance between the motor assembly and the paint pump assembly causes each plunger to compress the spring within the corresponding tube.

8. The paint delivery system of claim 7, wherein compression of the springs generates a biasing force that biases the motor assembly in the direction that increases the distance between the motor assembly and the paint pump assembly.

9. The paint delivery system of claim 1, further comprising:
a motor drive component coupled to the motor assembly;
a pump drive component coupled to the paint pump assembly; and
wherein the flexible linkage couples the motor assembly to the paint pump assembly hi forming a closed loop between the motor drive component and the pump drive component.

10. The paint delivery system of claim 9, wherein the linkage transfers rotational motion from the motor drive component to the pump drive component.

11. The paint delivery system of claim 1, wherein the paint spraying device comprises a spray gun.

12. A fluid delivery system comprising:
a support frame;
a motor assembly;
a locking mechanism configured to fix the position of the motor assembly relative to the support frame;
a fluid pump assembly spaced apart from the motor assembly, wherein the motor assembly is moveable to change a distance between the motor assembly and the fluid pump assembly;
a drive belt that couples the motor assembly to the fluid pump assembly; and
a belt tightening mechanism that generates a belt tightening force that moves the fluid pump assembly in a direction that increases the distance between the motor assembly and the fluid pump assembly.

13. The fluid delivery system of claim 12, wherein
the support frame comprises a cart,
the motor assembly is positioned above the fluid pump assembly, and
the locking mechanism fixedly couples the motor assembly to the frame.

* * * * *